United States Patent
Lim

(10) Patent No.: US 8,871,375 B2
(45) Date of Patent: Oct. 28, 2014

(54) COUPLING MEMBER BETWEEN BATTERY CELLS AND BATTERY CELL ASSEMBLY USING THE SAME

(75) Inventor: Seung-Ju Lim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 745 days.

(21) Appl. No.: 12/982,812

(22) Filed: Dec. 30, 2010

(65) Prior Publication Data

US 2011/0311858 A1 Dec. 22, 2011

(30) Foreign Application Priority Data

Jun. 17, 2010 (KR) .................. 10-2010-0057671

(51) Int. Cl.
*H01M 2/20* (2006.01)
*H01M 2/22* (2006.01)
*H01M 2/24* (2006.01)
*H01M 2/10* (2006.01)

(52) U.S. Cl.
CPC .............. *H01M 2/204* (2013.01); *H01M 2/206* (2013.01); *H01M 2/105* (2013.01); *Y02E 60/12* (2013.01)
USPC ............................. 429/158; 439/500; 439/627

(58) Field of Classification Search
USPC ........... 429/96–100, 149–160, 163–187, 123, 429/129, 130; 29/623.1–623.5; 180/68.5, 180/65.1; 221/282; 206/703
See application file for complete search history.

(56) References Cited

U.S. PATENT DOCUMENTS

| | | | |
|---|---|---|---|
| 4,091,186 A * | 5/1978 | Ott et al. ................. | 429/157 |
| 2003/0143459 A1 | 7/2003 | Kunimoto et al. | |
| 2009/0068555 A1* | 3/2009 | Fukuoka et al. ........... | 429/160 |

FOREIGN PATENT DOCUMENTS

| JP | 2002-246005 | 8/2002 |
|---|---|---|
| JP | 2003-223876 | 8/2003 |
| KR | 10-2008-0017506 | 2/2008 |
| KR | 10-2008-0042960 | 5/2008 |
| KR | 10-2008-0056443 | 6/2008 |

OTHER PUBLICATIONS

Machine Translation of Kunimoto et al. (JP 2003-223876, published Aug. 8, 2003, pp. 1-12).*
Machine Translation of Bang (KR 10-2008-0042960, published May 16, 2008, pp. 1-13).*

* cited by examiner

*Primary Examiner* — Basia Ridley
*Assistant Examiner* — Caitlin Wilmot
(74) *Attorney, Agent, or Firm* — Knobbe Martens Olson & Bear LLP

(57) ABSTRACT

A coupling member between battery cells and a battery cell assembly using the same are disclosed. Specifically, a coupling member between battery cells comprises a coupling body having battery insertion holes at first and second sides of the coupling body, and an insertion space in an interior of the coupling body; and a conductor installed in the insertion space to partition the insertion space into the first and second sides, the conductor configured to contact an electrode of the battery cells.

12 Claims, 6 Drawing Sheets

COUPLING MEMBER BETWEEN BATTERY CELLS AND BATTERY CELL ASSEMBLY USING THE SAME

RELATED APPLICATIONS

This application claims priority to and the benefit of Korean Patent Application No. 10-2010-0057671, filed on Jun. 17, 2010, in the Korean Intellectual Property Office, the entire content of which is incorporated herein by reference.

BACKGROUND

1. Field

An aspect of the present technology relates to a coupling member between battery cells and a battery cell assembly using the same. More particularly, an aspect of the present technology relates to the connection of electrodes of battery cells to each other using a coupling member without a welding operation, such that the connecting operation can be simplified, the connecting structure is strengthened, and prevention of connection failure is possible.

2. Description of the Related Technology

Recently, with the widespread use of mobile devices, batteries such as primary and secondary batteries are being actively used as their power sources.

Batteries used in industrial or medium to large-sized electric devices typically require high power. Hence, the amount of power is typically increased by using a large-capacity battery or by using a plurality of standard battery cells connected to one another.

Conventionally, the connection between battery cells is typically performed using a separate connection tab. That is, when electrodes of the battery cells are connected to each other, the connection tab and each of the electrodes are typically fixed to each other using a method such as nickel welding.

However, such a welding method can require an expensive apparatus to perform, and such a welding method can also be complicated and consume much operational time and man power. Moreover, the welding portion can be easily broken by external impact.

SUMMARY

Embodiments provide for a coupling member between battery cells, in which the connection between battery cells is implemented through an insertion operation that does not require a separate welding operation such that the connecting operation can be simplified, and the strength of a connecting structure can be increased.

In one embodiment, a coupling member between battery cells can strengthen the connecting structure between battery cells using an electrode connecting structure between the battery cells.

According to an aspect of the present invention, a coupling member between battery cells comprises: a coupling body having battery insertion holes at first and second sides of the coupling body, and an insertion space in an interior of the coupling body; and a conductor installed in the battery insertion space to partition the battery insertion space into the first and second sides, the conductor contacting an electrode of the battery cells.

In one embodiment, the conductor may include a conductive plate positioned at the center of the insertion space, and a coupling plate that connects the circumference of the conductive plate and the inner circumferential surface of the coupling body.

The coupling plate may be formed in the shape of a flat plate, and the conductive plate may be formed to be convex with respect to one of the first or second sides of the coupling body so as to have the structure of an elastic leaf spring.

The conductive plates may be formed opposite to each other at an interval, and an elastic member may be formed between the conductive plates.

The coupling body may include a plurality of coupling bodies, each coupling body having a battery insertion holes at first and second sides, and an insertion space in its interior, a plurality of conductors installed in the insertion spaces of the plurality of coupling bodies to partition each insertion space into first and second sides, and a plurality of conductors installed in the insertion spaces of the plurality of coupling bodies to partition each insertion space into first and second sides. The plurality of coupling bodies may be arranged such that their outer circumferential surfaces contact each other. A through-hole may be formed in each of the coupling bodies so that the conductors are connected to each other through the through-hole.

The conductive plate and the coupling plate may be integrally formed into an elastic leaf spring. The conductive plate and the coupling plate may be made of different materials.

The coupling plate may be formed in the shape of a flat plate, and the conductive plate may be formed to be convex with respect to one of first or second sides thereof.

In another embodiment, the conductor may have a hole formed at the center thereof so that a conductive member is inserted into the hole. The conductor may be formed in the shape of a flat plate.

In still another embodiment, the conductor may include a first conductive plate positioned at the center of the battery insertion space; a first coupling plate that connects the first conductive plate to an inner circumferential surface of the coupling body; a second conductive plate formed opposite to the first conductive plate; and a second coupling plate that connects the second conductive plate to the inner circumferential surface of the coupling body.

The first conductive plate and the first coupling plate may be integrally formed into an elastic leaf spring, and the second conductive plate and the second coupling plate may be integrally formed into an elastic leaf spring. The first and second conductive plates and the first and second coupling plates may be made of different materials.

The first and second coupling plates may be formed in the shape of a flat plate, and the first and second conductive plates may be formed to be convex with respect to the battery insertion holes. An elastic member may be further formed between the first and second conductive plates. The elastic member may be formed at a concave portion positioned at the center portion between the first and second conductive plates.

According to an aspect of the present invention, a battery cell assembly includes the aforementioned coupling members between battery cells, and a plurality of battery cells, wherein the end of each battery cell is inserted into an insertion space in each of the coupling members. The plurality of battery cells may be connected in a serial or parallel connection structure.

As described above, according to embodiments of the present invention, since battery cells are connected through a structure in which end portions of the battery cells are inserted into both battery insertion holes of a coupling body, a separate welding operation is not necessary. Thus, the inconvenience of the welding operation can be reduced, and operational time and manpower can be saved.

Moreover, because each of the battery cells may be directly connected to the coupling member, the connection portions between the battery cells can be strengthened.

An elastic member can also be provided to the interior of a conductor, so that in a case where three or more battery cells are connected to one another, pressure can be applied at both ends of each of the battery cells. Thus, shaking of the battery cells and other disturbances can be prevented.

Also, in the embodiment in which outer circumferential surfaces of coupling bodies contact one another by the use of a plurality of coupling conductors between the coupling bodies and conductors, the conductors of the coupling bodies can be connected to provide for a parallel connection structure of the battery cells.

BRIEF DESCRIPTION OF THE DRAWINGS

The accompanying drawings, together with the specification, illustrate embodiments of the present invention and, together with the description, serve to explain the principles of embodiments of the present invention.

DETAILED DESCRIPTION

Figure 1:
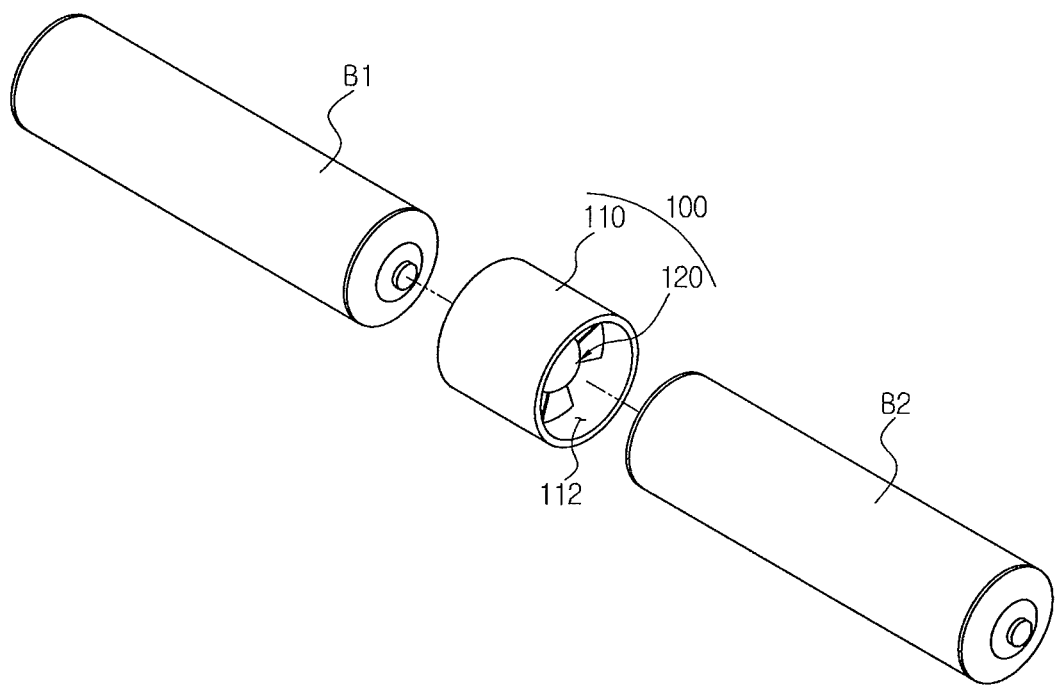
FIG. 1 is an exploded perspective view of the connection structure between battery cells and a coupling member.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. In the drawings, the thickness or size of layers are exaggerated for clarity and not necessarily drawn to scale.

First Embodiment

Serial Connection Structure

Figure 2:
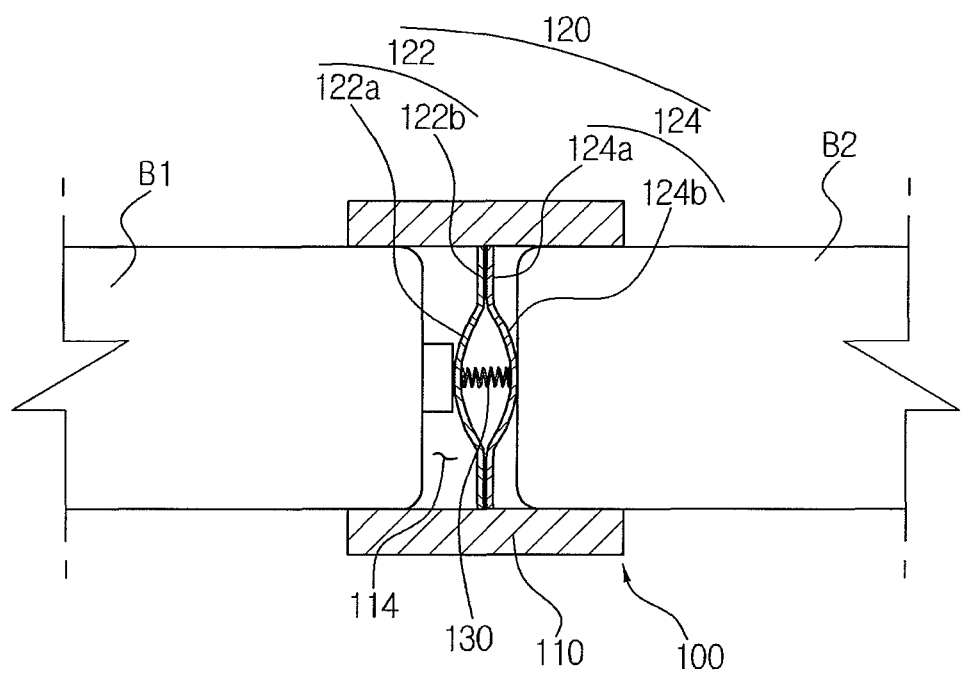
FIG. 2 is a partially enlarged sectional view showing a state in which the battery cells are connected in series to each other through the coupling member.

As shown in FIGS. 1 and 2, a coupling member 100 between battery cells according to an embodiment of the present invention includes a coupling body 110, a conductor 120 and an elastic member 130.

The battery cells described hereinbelow can be applied to both primary and secondary batteries.

The coupling body 110 may be a portion that is substantially connected to each of the battery cells. The coupling body 110 may be formed in the shape of a cylinder having an inside diameter identical to the diameter of each of the battery cells B1 and B2. Both sides of the coupling body 110 may be opened to form battery insertion holes 112, and battery insertion spaces 114 respectively communicating with the battery insertion holes 112 may be formed in the interior of the coupling body 110.

The shape of the coupling body 110 may be modified according to the kind of battery cell. That is, in a case where the battery cell is of a cylinder shape, the coupling body 110 may also be formed in the shape of a cylinder. In a case where the battery cell is of a prismatic shape, the coupling body 110 may also be formed in the shape of a prismatic tube.

The material of the coupling body 110 may include any one of metal and plastic. However, in a case where end portions of the battery cells are inserted into both sides of the coupling body 110, respectively, all loads are concentrated on the coupling body 110. Hence, the coupling body 110 itself may be made of a material with a sufficient strength, so that it is possible to prevent breakdown due to the concentration of loads, and the like.

The length of the coupling member 110 may be formed so that when the respective battery cells B1 and B2 are inserted into both sides of the coupling member 110, the end portions of the respective battery cells B1 and B2 are sufficiently inserted into both sides of the coupling member 110 to prevent the shaking of the battery cells, and the like.

A conductor 120 for the conduction between the battery cells B1 and B2 may be installed in the interior of the coupling member 110.

The conductor 120 may be a portion that simultaneously performs a function of electrically connecting the battery cells B1 and B2 to each other and a function of preventing the shaking of the battery cells B1 and B2. The conductor may include a first conductor 122, a second conductor 124 and an elastic member 130.

The first conductor 122 may be a portion that comes in contact with an electrode of the first battery cell B1 inserted into one side of the coupling body 110. The first conductor 122 can include a first conductive plate 122a and a first coupling plate 122b.

The first conductive plate 122a may be a portion that substantially comes in contact with the electrode of the first battery cell B1. The first conductive plate 122a may be made of a metallic material with high conductivity and have the shape of a thin plate. The first conductive plate 122a may be positioned at the center point of the insertion space 114 of the coupling body 110.

In this embodiment, the first conductive plate 122a may be formed to have a dome shape that is convex toward the electrode of the first battery cell B1.

The first coupling plate 122b can serve as a connecting medium between the first conductive plate 122a and the coupling body 110. The first coupling plate 122b may be formed in the shape of a thin plate. In the state that a plurality of first coupling plates 122b are arranged at an interval along the circumference of the first conductive plate 122a, one end of each of the first coupling plates 122b may be connected to the circumference of the first conductive plate 122a, and the other end of each of the first coupling plates 122b may be connected to an inner circumferential surface of the coupling body 110.

The first conductive plate 122a can be positioned in the insertion space 114 of the coupling body 110 by the first coupling plate 122b.

Because the first coupling plate 122b mainly functions to install the first conductive plate 122a in some embodiments, it can be unnecessary that the first coupling plate 122b is made of a material with conductivity. The first coupling plate 122b may be made of a material with a strength at which the position of the first conductive plate 122a can be fixed.

For reference, the first conductive plate 122a and the first coupling plate 122b have been described for convenience of illustration. However, the first conductive plate 122a and the first coupling plate 122b may be simultaneously formed into a single body by machining a plate.

In this embodiment, the first conductive plate 122a may be formed in a dome shape as described above. Thus, in a case where the first conductive plate 122a and the first coupling plate 122b are simultaneously formed in a single body, the first conductive plate 122a itself may have a leaf spring structure.

That is, if the first battery cell B1 is inserted into the one side of the coupling body 110 and a convex surface of the first conductive plate 122a is then pressurized, the first conductive plate 122a may be pressurized with respect to the boundary point between the first conductive plate 122a and the first coupling plate 122b. In this state, an elastic force that tends to return to the first battery cell B1 may be applied to the first conductive plate 122a.

In addition to the first conductor 122, the second conductor 124 may be a portion that comes in contact with an electrode of the second battery cell B2 inserted into the other side of the coupling body 110. The second conductor 124 may be formed to be symmetrical with the first conductor 122 such that it has the same configuration as the first conductor 122.

That is, the second conductor 124 may be formed into a structure in which a second conductive plate 124a is positioned to have a symmetrical structure with the first conductive plate 122a, and a second coupling plate 124b may be connected to the circumference of the second conductive plate 124a while coming in contact with the first coupling plate 122b so as to connect the coupling body 110 and the second conductive plate 124a.

As the first and second conductive plates 122a and 124a each having a dome shape are arranged into a symmetrical structure, a space portion may be formed between the first and second conductive plates 122a and 124a.

A separate elastic member 130 may be installed in the space portion.

The elastic member 130 can function to increase the elastic force of each of the first and second conductive plates 122a and 124a. The elastic member 130 may be formed in a general coil spring shape. One end of the elastic member 130 may contact a concave surface of the first conductive plate 122a, and the other end of the elastic member 130 may come in contact with a concave surface of the second conductive plate 124a.

Thus, the first and second conductive plates 122a and 124a may be electrically connected to each other by the medium of the elastic member 130.

Since each of the first and second conductive plates 122a and 124a may have a leaf spring structure as described above, the elastic member 130 can simply function to complement the elastic force of each of the first and second conductive plates 122a and 124a. Therefore, it may be unnecessary to provide the elastic member 130.

As the conductor 120 is installed in the insertion space 114 of the coupling body 110, the insertion space 114 may have a structure in which it is partitioned into both sides about the conductor 120.

Figure 3:
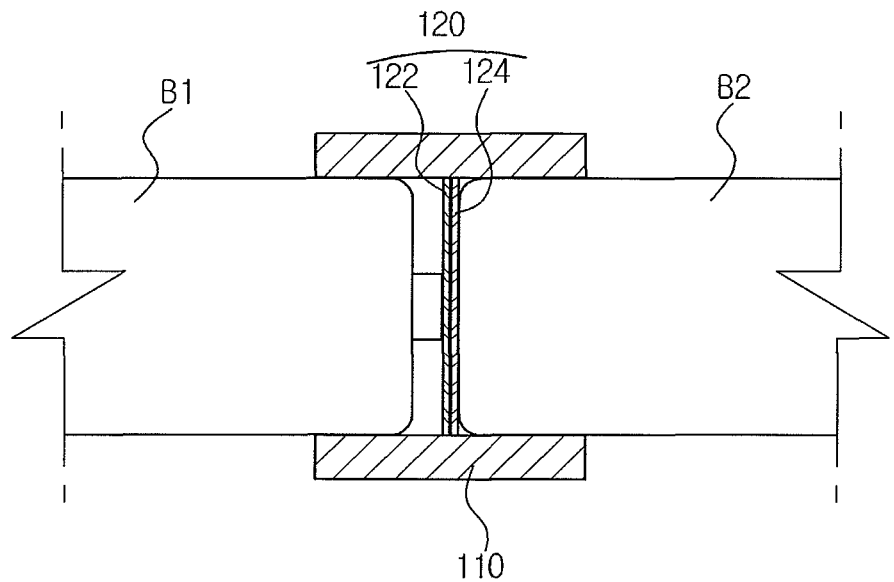
FIGS. 3 to 5 are partially enlarged sectional views showing modifications of a conductor.

The configuration of the conductor 120 may be variously modified. For example, the entirety of the first and second conductors 122 and 124 may be formed in the shape of a plate as shown in FIG. 3. In a case where only two battery cells are connected, such plate like conductors may be applied where it is unnecessary to apply pressure for preventing the shaking of each of the battery cells.

Figure 4:
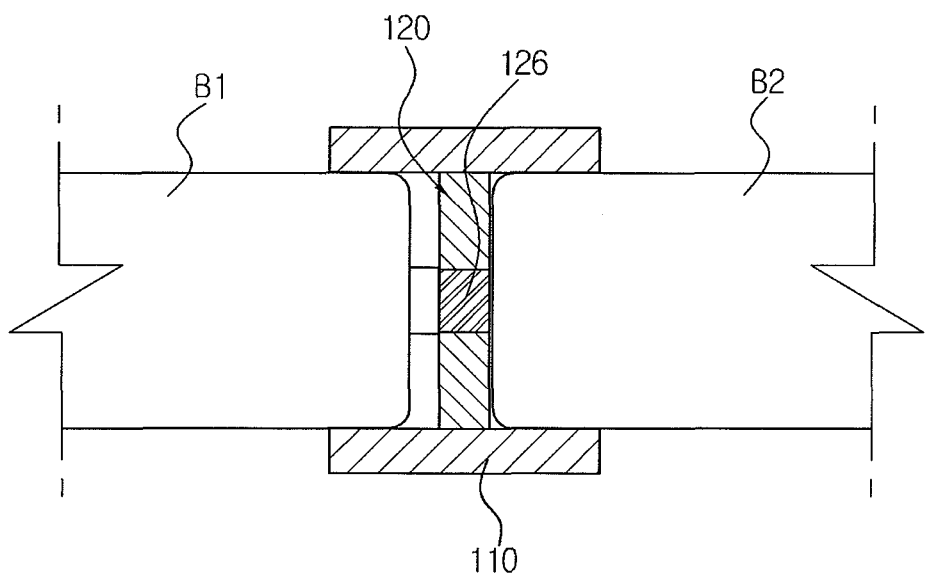

As shown in FIG. 4, the conductor 120 may be formed in the shape of a simple plate. In this embodiment, a hole may be formed at the center of the conductor 120, and a conductive member 126 may be inserted into the hole.

In this case, since the conductive member 126 can substantially serve as a conductor, the other portion of the conductor 120 except the conductive member 126 may not be made of a conductive material.

Although not shown in FIG. 4, the conductor 120 may be modified into a structure in which the first and second conductive plates 122a and 124a are simultaneously connected to the first coupling plate 122b without the second coupling plate 124b.

Figure 5:
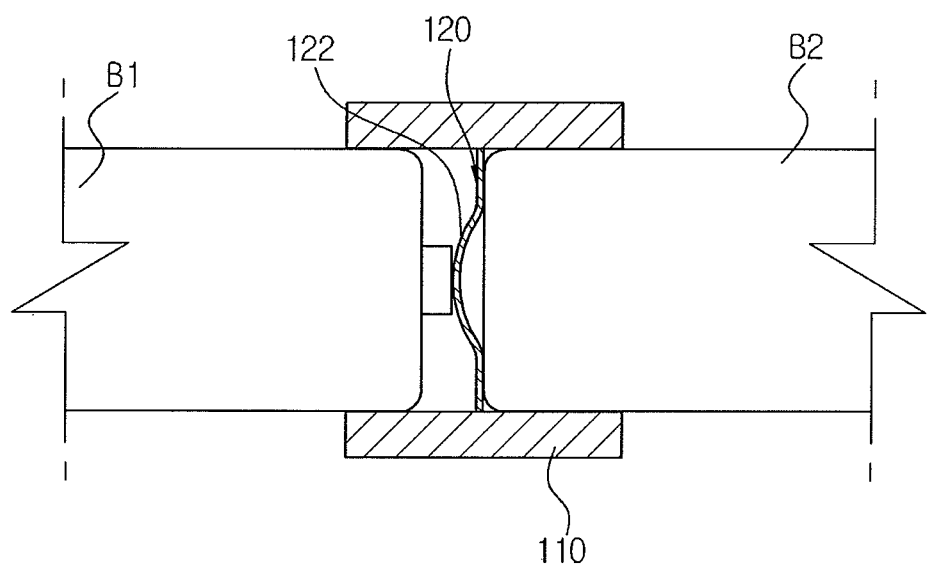

As shown in FIG. 5, the first conductor 122 may be applied in a state in which the entire second conductor 124 is omitted. In this case, a negative electrode of one battery cell, which has a relatively wide area, may be positioned at a concave portion of the first conductive plate 122a, and a positive electrode of the other battery cell, which has a relatively narrow area, can contact a convex portion of the first conductive plate 122a.

In this embodiment, the negative electrode of the one battery cell may not contact the concave portion but contact only the first coupling plate 122b. Therefore, the first coupling plate 122b may be applied as a conductor so as to perform the function of the conductor.

Hereinafter, the operation and effect by the configuration according to this embodiment will be described.

In the state in which the first and second battery cells B1 and B2 are respectively positioned at both sides of the coupling body 110 as shown in FIG. 1, the negative-electrode-side end portion of the first battery cell B1 may be inserted into the one insertion space 114 of the coupling body 110, and the positive-electrode-side end portion of the second battery cell B2 may be inserted into the other insertion space 114 of the coupling body 110 as shown in FIG. 2.

Thus, the inserted negative electrode of the first battery cell B1 can contact the first conductive plate 122a, and the positive electrode of the second battery cell B2 can contact the second conductive plate 124a.

As the end portions of the first and second battery cells B1 and B2 are simultaneously inserted into the coupling body 110, the first and second battery cells B1 and B2 may be physically connected to each other through the coupling body 110.

Since the first and second conductive plates 122a and 124a are connected to each other through the elastic member 130, the first and second battery cells B1 and B2 may be electrically connected to each other through the first and second conductive plates 122a and 124a and the elastic member 130. Thus, the first and second battery cells B1 and B2 may be electrically and physically connected in series to each other.

Figure 6:
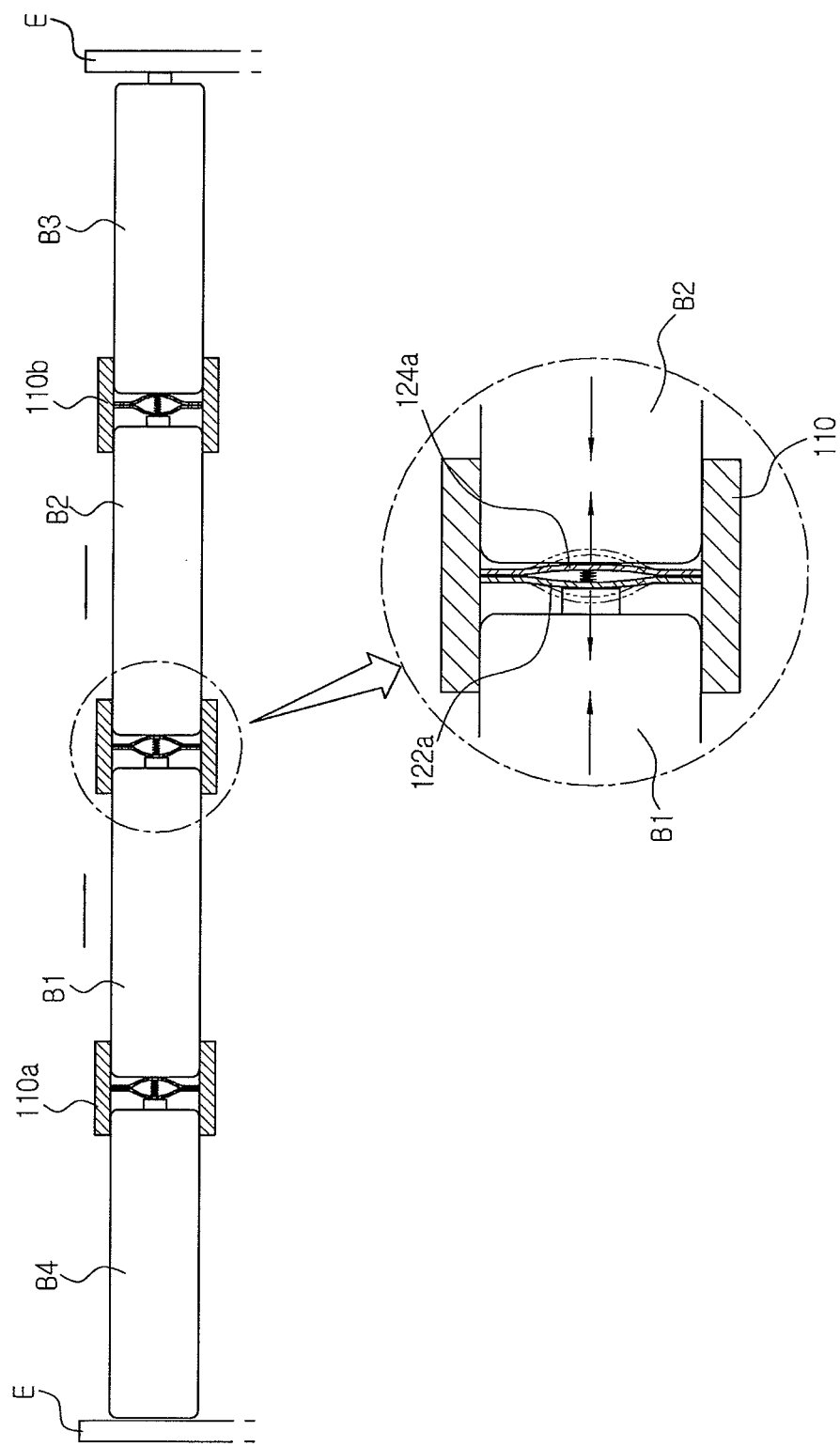
FIG. 6 is a schematic view showing a phenomenon in which when four battery cells are connected to one another, pressure is applied to each of the battery cells.

In a case where battery cells are additionally connected in this state, the other end portions of the first and second battery cells B1 and B2 may be respectively inserted into insertion holes of second and third coupling bodies 110a and 110b, and end portions of the added third and fourth battery cells B3 and B4 may be respectively inserted into the other insertion holes of the second and third coupling bodies 110a and 110b as shown in FIG. 6. Then, the end portions of the battery cells may be connected to one another through the first, second and third bodies 110, 110a and 110b in the state that the first, second, third and fourth battery cells B1, B2, B3 and B4 may be arranged in series to one another.

In this embodiment, the third battery cell B3 may be electrically connected to the second battery cell B2 through the conductor of the second coupling body 110a, and the fourth battery cell B4 may be electrically connected to the first battery cell B1 through the conductor of the third coupling body 110b.

In a case where additional battery cells are additionally connected in series in this state, the additional connection can be performed by repeating the aforementioned structure.

In the state that the first, second, third and fourth battery cells B1, B2, B3 and B4 are connected in series to one another as described above, the first and second battery cells B1 and B2 may be pushed toward each other by the third and fourth battery cells B3 and B4. As the first and second conductive plate 122a and 124a are pressurized, each of the first and second conductive plates 122a and 124a may be turned over in the opposite direction, and therefore, the elastic member may be pressurized in both directions.

Simultaneously, a force that pushes each of the first and second battery cells B1 and B2 in the opposite direction may be applied in addition to the self-elastic force of each of the first and second conductive plates 122a and 124a and the elastic force of the elastic member 130.

However, since both end portions of the third and fourth battery cells B3 and B4 may be respectively connected to separate electrode portions E so that the positions of the third and fourth battery cells B3 and B4 are fixed, each of the first and second battery cells B1 and B2 may not be pushed in the opposite direction, but the pressurized state in both direction can be maintained. Thus, the positions of the first and second battery cells B1 and B2 can be firmly maintained, so that it is possible to prevent the shaking of the battery cells, and the like.

As described above, the physical and electrical connection between battery cells may be implemented through a structure in which an end portion of each of the battery cells can be inserted into a coupling member without performing a separate welding operation. Thus, the connection operation can be simplified, and it may be possible to prevent a welding portion from being broken down.

Second Embodiment

Parallel Connection Structure

Figure 7:
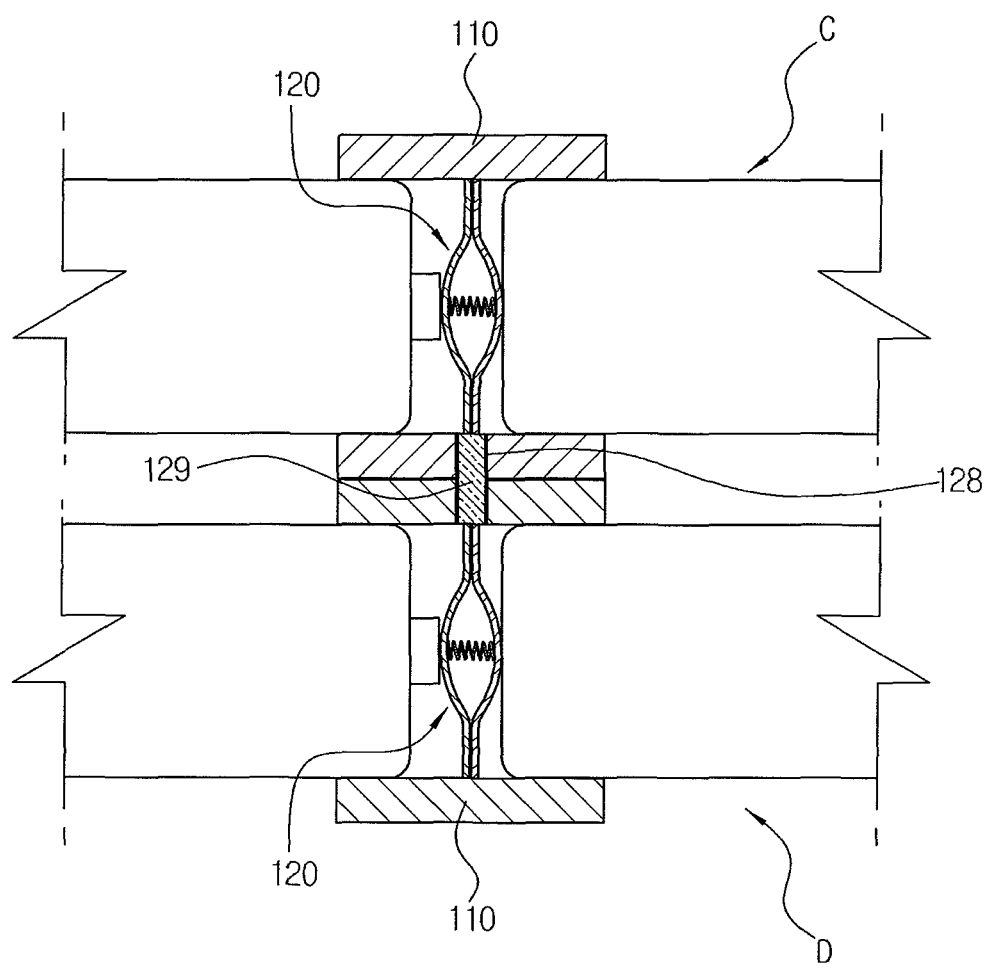
FIG. 7 is a schematic view showing the parallel connection structure of battery cells.

FIG. 7 shows a case in which the aforementioned serial connection structures of the battery cells are connected in parallel to each other.

The second embodiment is identical to the first embodiment in that a plurality of battery cells can be connected in series using coupling members 100. However, the second embodiment is different from the first embodiment in that as a connection structure is added to the coupling members 100 used in the serial connection, the coupling members 100 can be directly connected to each other, thereby implementing an entire parallel connection structure.

To this end, each of the coupling members 100 used in this embodiment may be manufactured so that a through-hole 128 that communicates an insertion space 114 with the exterior may be formed in a coupling body 110, and a separate coupling conductor 129 may be inserted into the through-hole 128. Thus, one end of the coupling conductor 129 may be connected to a conductor 120 of the coupling member 100, and the other end of the coupling conductor 129 may be protruded to the exterior.

As shown in FIG. 7, battery cells may be connected in series to each other using each of the coupling members 100. In the embodiment in which a plurality of serial connection bodies are provided, the coupling member 100 of a first serial connection body C and the coupling member 100 of a second serial connection body D are positioned closely to each other.

In this embodiment, an end portion of the coupling conductor 120 provided to the coupling member 100 of the first serial connection body C is inserted into the through-hole 128 of the coupling member 100 of the second serial connection body D and then connected to a conductor of the corresponding coupling member 100. Thus, the first and second serial connection bodies C and D may be electrically connected in parallel to each other, and the parallel connection structure between the first and second serial connection bodies C and D can be completed.

As described above, the end portions of battery cells may be connected to each other using a separate coupling member, so that a parallel connection structure between serial connection bodies can be possible in addition to a serial connection structure. Thus, various welding methods can be performed as compared to a simple welding method.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A coupling member between battery cells, comprising:
    a coupling body having battery insertion holes at first and second sides of the coupling body, and an insertion space in an interior of the coupling body; and
    a conductor installed in the insertion space to partition the insertion space into the first and second sides, the conductor configured to contact an electrode of the battery cells wherein the conductor comprises:
    a first conductive plate positioned at the center of the insertion space;
    a first coupling plate that connects the first conductive plate to an inner circumferential surface of the coupling body;
    a second conductive plate formed opposite to the first conductive plate; and
    a second coupling plate, separate from the first coupling plate, that connects the second conductive plate to the inner circumferential surface of the coupling body wherein the first and second coupling plates contact each other wherein the first and second conductive plates have convex surfaces having centers that couple with the battery cells and wherein the centers of convex surfaces of the first and second conductive plates are positioned along substantially the same axis.

2. The coupling member according to claim 1, wherein the first and second conductive plates have a circumference positioned at the center of the insertion space, and the first and second coupling plates connect the circumference of the first and second conductive plates and an inner circumferential surface of the coupling body.

3. The coupling member according to claim 1, wherein the conductor has a hole formed at the center thereof so that a conductive member is inserted into the hole.

4. The coupling member according to claim 3, wherein the conductor is formed in the shape of a flat plate.

5. The coupling member according to claim 1, wherein the first conductive plate and the first coupling plate are integrally formed into an elastic leaf spring, and the second conductive plate and the second coupling plate are integrally formed into an elastic leaf spring.

6. The coupling member according to claim 1, wherein the first and second conductive plates and the first and second coupling plates are made of different materials from each other.

7. The coupling member according to claim 1, wherein the first and second coupling plates are formed in the shape of a flat plate, and the first and second conductive plates are each formed to be convex with respect to the battery insertion holes.

8. The coupling member according to claim 7, wherein an elastic member is further formed between the first and second conductive plates.

9. The coupling member according to claim 1, wherein:
the coupling body includes a plurality of coupling bodies, each coupling body having battery insertion holes at its first and second sides, and an insertion space in its interior;
a plurality of conductors are installed in the insertion spaces of the plurality of coupling bodies to partition each insertion space into first and second sides;
each conductor is configured to contact an electrode of the battery cells;
the plurality of coupling bodies is arranged such that their outer circumferential surfaces contact each other; and
a through-hole is formed in each of the coupling bodies so that the conductors are connected to each other through the through-hole.

10. A battery cell assembly comprising a plurality of coupling members between battery cells according to claim 1, and a plurality of battery cells, wherein the ends of each of the battery cells are inserted into an insertion space of each of the coupling members.

11. The battery cell assembly according to claim 10, wherein the plurality of battery cells has a serial connection structure.

12. The battery cell assembly according to claim 10, wherein the plurality of coupling members between battery cells and the plurality of battery cells has a parallel connection structure.

* * * * *